United States Patent
Liu et al.

(10) Patent No.: US 10,410,662 B1
(45) Date of Patent: Sep. 10, 2019

(54) PREVENTING DATA STORAGE DEVICE FAILURE DUE TO CHANGES IN HEAD FLY HEIGHT

(71) Applicant: Seagate Technology LLC, Cupertino, CA (US)

(72) Inventors: Xiong Liu, Singapore (SG); Quan Li, Singapore (SG); Lihong Zhang, Singapore (SG); Chengyi Guo, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 16/161,916

(22) Filed: Oct. 16, 2018

(51) Int. Cl.
  *G11B 5/54* (2006.01)
  *G11B 5/60* (2006.01)
  *G11B 5/55* (2006.01)
  *G11B 5/56* (2006.01)
  *G11B 5/00* (2006.01)

(52) U.S. Cl.
  CPC .......... *G11B 5/607* (2013.01); *G11B 5/5534* (2013.01); *G11B 5/56* (2013.01); *G11B 5/6029* (2013.01); *G11B 2005/0021* (2013.01)

(58) Field of Classification Search
  CPC .............. G11B 5/54; G11B 27/36; G11B 5/09
  USPC ...................................... 360/31, 75
  See application file for complete search history.

(56) References Cited

U.S. PATENT DOCUMENTS

| | | | |
|---|---|---|---|
| 7,023,647 B2 | 4/2006 | Bloodworth et al. | |
| 7,180,692 B1 | 2/2007 | Che et al. | |
| 7,298,566 B2 | 11/2007 | Ueda et al. | |
| 7,423,829 B2 | 9/2008 | Bang et al. | |
| 8,059,357 B1 | 11/2011 | Knigge et al. | |
| 8,300,338 B1 * | 10/2012 | McFadyen | G11B 5/6029 360/31 |
| 8,732,555 B2 | 5/2014 | Camalig et al. | |
| 9,001,451 B1 | 4/2015 | Martin et al. | |
| 10,049,692 B1 | 8/2018 | Liu et al. | |
| 2007/0201158 A1 | 8/2007 | Chan | |
| 2012/0050907 A1 | 3/2012 | Haapala | |
| 2018/0158483 A1 | 6/2018 | Liu et al. | |

* cited by examiner

*Primary Examiner* — Nabil Z Hindi
(74) *Attorney, Agent, or Firm* — Westman, Champlin & Koehler, P.A.

(57) ABSTRACT

A disc drive includes a data storage surface having a system data zone and a user data zone, and a head that communicates with the data storage surface. The disc drive also includes a control circuit communicatively coupled to the head. The control circuit is configured to, during power up initialization of the disc drive, apply a fly height control value to direct the head to fly at a first target fly height for reading system data from the system data zone. The first target fly height is substantially higher than a second target fly height for reading user data from the user data zone. The control circuit determines whether an actual fly height of the head is substantially equal to the first target fly height. The control circuit performs fly height correction when the actual fly height is not substantially equal to the first target fly height.

20 Claims, 7 Drawing Sheets

PREVENTING DATA STORAGE DEVICE FAILURE DUE TO CHANGES IN HEAD FLY HEIGHT

SUMMARY

In one embodiment, a disc drive is provided. The disc drive includes a data storage surface having a system data zone and at least one user data zone. The disc drive also includes a head that communicates with the data storage surface. The disc drive further includes a control circuit communicatively coupled to the head. The control circuit is configured to, during power up initialization of the disc drive, apply a fly height control value to direct the head to fly at a first target fly height for reading system data from the system data zone. The first target fly height is substantially higher than a second target fly height for reading user data from the user data zone. The control circuit is further configured to, while the head is reading the system data with the fly height control value applied to the head, determine whether an actual fly height of the head is substantially equal to the first target fly height. The control circuit performs fly height correction when the actual fly height is not substantially equal to the first target fly height.

In another embodiment, a method is provided. The method includes performing certification operations in a disc drive that includes at least one data storage surface and a head that communicates with the data storage surface. The certification operations include building a transfer function for use in correcting fly height of the head over the at least one data storage surface. The certification operations also include storing, in the disc drive, parameters of the transfer function and a first fly height control value for directing the head to fly at a first target fly height for reading system data from the system data zone. The first target fly height is substantially higher than a second target fly height for reading user data from the user data zone. The method further includes performing field operations in the disc drive. The field operations include, during power up initialization of the disc drive, applying the first fly height control value to direct the head to fly at the first target fly height for reading system data from the system data zone.

In yet another embodiment, a method is provided. The method includes applying a first fly height control value to direct a head to fly at a first target fly height for reading system data from a system data zone of a data storage surface. The first target fly height is substantially higher than a second target fly height for reading user data from a user data zone of the data storage surface. The method also includes, while the head is reading the system data with the first fly height control value applied to the head, determining whether an actual fly height of the head is substantially equal to the first target fly height. The method further includes performing fly height correction when the actual fly height is not substantially equal to the first target fly height.

Other features and benefits that characterize disclosed aspects will be apparent upon reading the following detailed description and review of the associated drawings.

DETAILED DESCRIPTION OF ILLUSTRATIVE EMBODIMENTS

Figure 1:
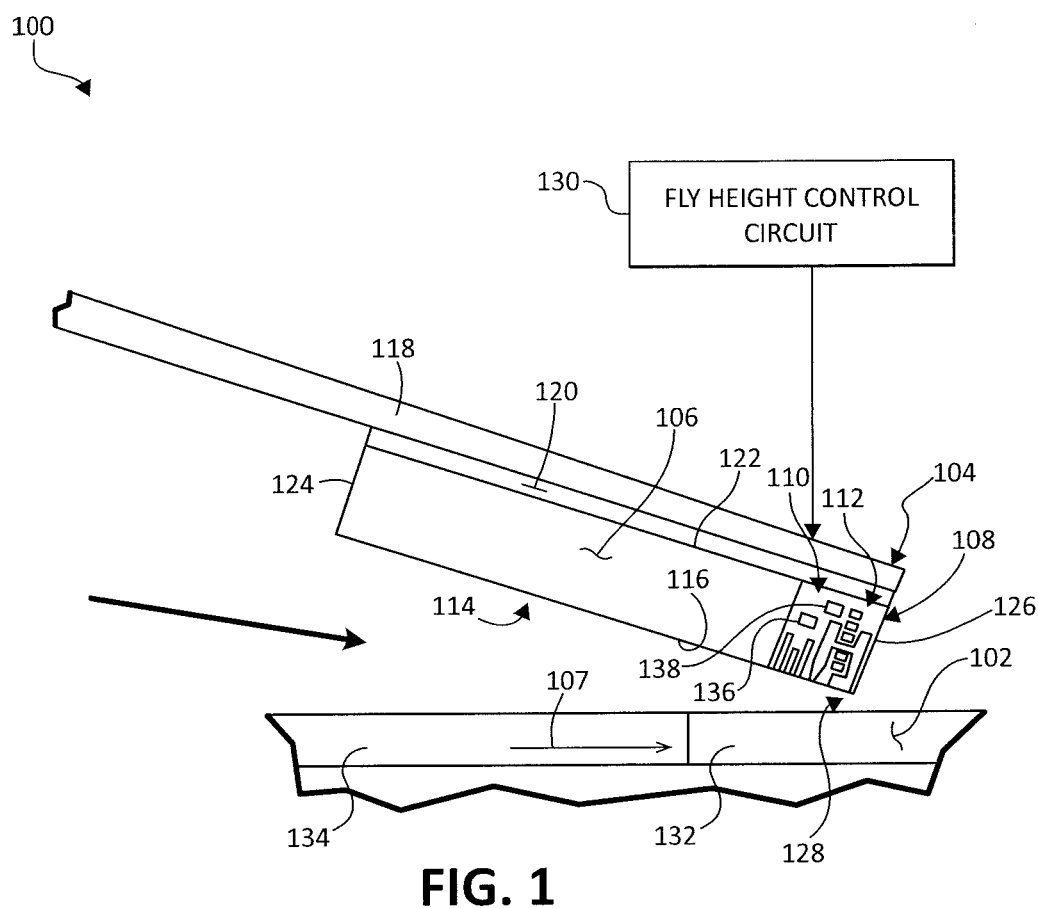
FIG. 1 is a diagrammatic illustration of a portion of a data storage device in accordance with one embodiment.

In a data storage device such as a disc drive, a controller manages read/write operations by, for example, controlling a head that communicates with a data storage disc. The head is supported by, for example, an air bearing slider that carries the head and appropriately positions the head above the rotating disc. The slider typically "flies" above the disc at ultra-low fly heights. The fly height is the gap between the head and the disc.

When the disc drive is subjected to a high level shock when not in operation (referred to herein as non-operational shock (NOS)), certain components within the disc drive may be shifted or drifted. This shifting or drifting may result in fly height changes the next time the drive is powered up and used. If the fly height changes are such the spacing between the head and the data storage medium is reduced relative to a nominal fly height, which may be set at the time of disc drive calibration during manufacture of the disc drive, the probability of a head-medium contact events increases. Such events may damage the head and/or the data storage medium. Alternatively, if the fly height changes are such that the spacing between the head and the data storage medium is increased relative to the nominal fly height, bit error rates may increase. Due to NOS-related fly height changes, during power-up initialization, the disc drive may enter into a "drive not ready" failure mode, which prevents normal operation of the drive. This may result in the customer returning the disc drive to the manufacturer.

Embodiments of the disclosure address the above-noted NOS-related problems without substantially adding to the disc drive power up initialization time or TTR (time-to-ready).

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a diagrammatic illustration of a portion of data storage device 100 that shows a side view of a head 104 above a data storage medium 102. The head 104 includes a transducer portion 108 on a slider 106. The transducer portion 108 shown in FIG. 1 includes a read element 110 and a write element 112. Alternatively, the head 104 may be a head exclusively for reading or writing that includes only the read element 110 or only the write element 112 and not both elements 110 and 112.

As shown, the head 104 includes a bearing surface (for example, an air bearing surface (ABS)) 114 along a bottom surface 116 of the head or slider facing the medium 102. The head 104 is coupled to a load beam 118 through a gimbal spring 120 coupled to a top surface 122 of the head or slider 106 facing away from the medium 102. The medium 102 can be a continuous storage medium, a discrete track medium, a bit patterned medium or other magnetic storage medium including one or more magnetic recording layers.

During operation, rotation of the medium or disc 102 creates an air flow in direction 107 as shown in FIG. 1 along the ABS 114 of the slider 106 from a leading edge 124 to a trailing edge 126 of the slider 106 or head 104. Air flow along the ABS 114 creates a pressure profile to support the head 104 and slider 106 above the medium 102 at a fly height 128 for read and write operations. As can be seen in FIG. 1, a fly height control circuit 130 is employed to control height 128 of the head 104 above the medium 102. Fly height control circuit 130 may be a single circuit or may include multiple sub-circuits. In some embodiments, fly height control circuit 130 may form a portion of disc drive control circuitry (not shown in FIG. 1). Fly height control may be carried out by circuit 130 by controlling heat applied by a read heater 136 and/or a write heater 138 of head 104.

In one embodiment, data storage medium 102 is divided into multiple zones with the multiple zones including a system data zone 132, which may store drive information, and at least one user data zone 134. Data in the system data zone 132 may be stored at a relatively low areal density, which enables the data to be read at a relatively high fly height. In contrast, data in user data zone 134 may be stored at a relatively high areal density, and therefore a relatively low fly height is utilized to read the user data. In one embodiment, fly height control circuit 130 is configured to, during power up initialization of the data storage device 100, apply a fly height control value to direct the head 104 to fly at a first target fly height for reading system data from the system data zone 132. The first target fly height is substantially higher than a second target fly height for reading user data from the user data zone 134. The fly height control circuit 130 is further configured to, while the head 104 is reading the system data with the fly height control value applied to the head 104, determine whether an actual fly height of the head 104 is substantially equal to the first target fly height. Since the system data reading and the fly height detection are performed simultaneously, this embodiment does not negatively affect drive TTR. If the fly height control circuit 130 determines the actual fly height is not substantially equal to the first target fly height, circuit 130 performs fly height correction in a manner described below in connection with FIG. 2.

Figure 2:
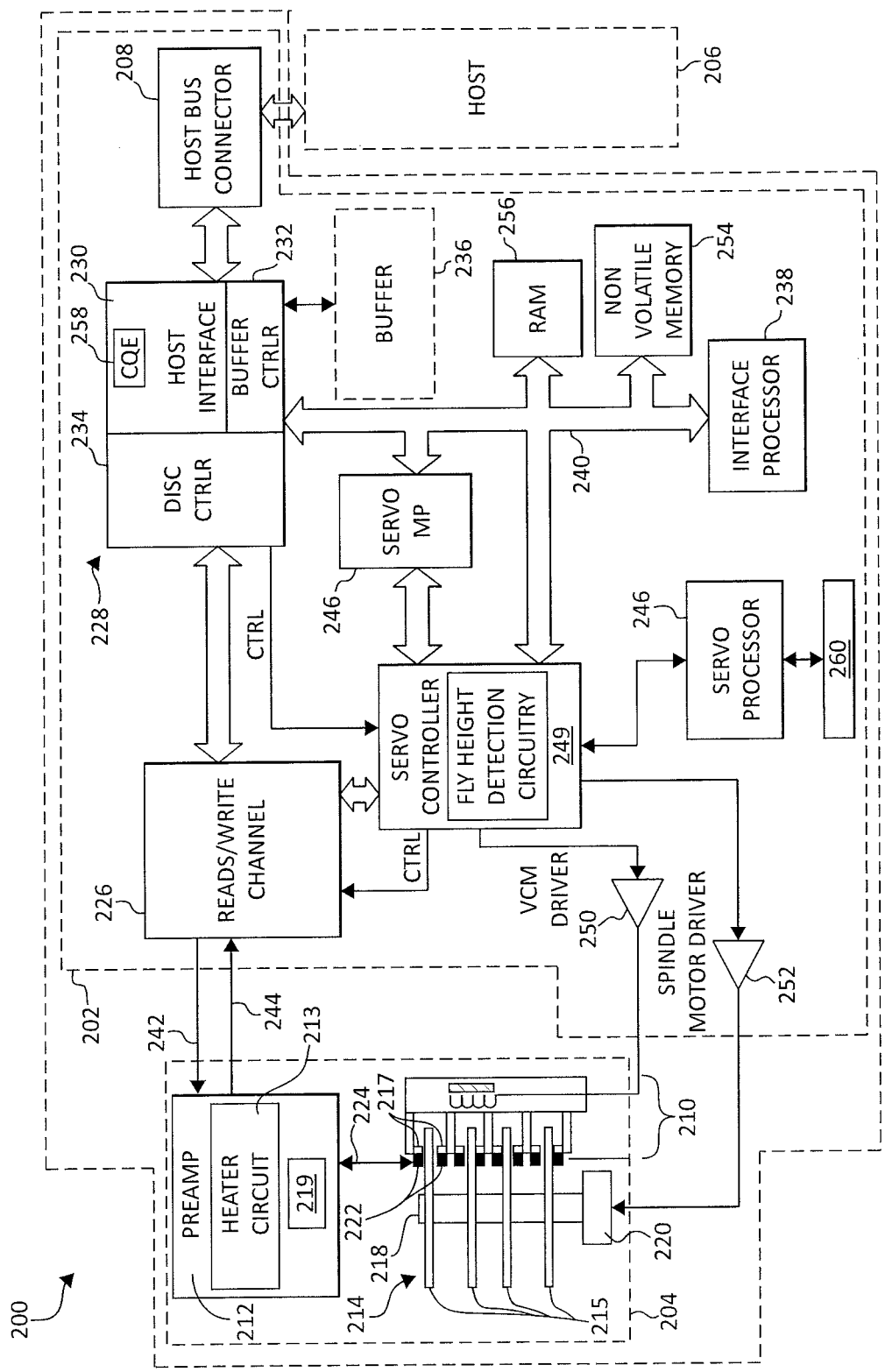
FIG. 2 is a block diagram of a disc drive in accordance with one embodiment.

Referring now to FIG. 2, a disc drive data storage system 200 in which fly height may be corrected in accordance with an example embodiment, is shown. Disc storage system 200 includes a printed circuit board assembly (PCBA) 202 and a head-disc assembly (HDA) 204. PCBA 202 includes circuitry and processors, which provide a target interface controller (or drive controller) for communicating between a host system 206 and HDA 204. Host system 206 can include a microprocessor-based data processing system such as a personal computer or other system capable of performing a sequence of logical operations. Data is transmitted between host system 206 and PCBA 202 via a host bus connector 208. HDA 204 includes an actuator assembly 210, a preamplifier 212, and a disc assembly 214. Disc assembly 214 includes one or more media discs 215, stacked on a spindle assembly 218. Spindle assembly 218 is mechanically coupled to a spindle motor 220 for rotating the disc(s) at a high rate of speed.

Actuator assembly 210 includes a voice coil motor, and multiple actuator arms. Located at the end of each actuator arm are one or more sliders/transducer heads such as 222, which are associated with a respective disc surface. Transducer heads 222 communicate with disc controller circuit board 202 via a cable assembly 224 connected to preamplifier 212 for reading and writing data to the transducer head's associated disc surface. Preamplifier 212 provides an amplified signal to a read/write channel 226 of PCBA 202. Read/write channel 226 performs encoding and decoding of data written to and read from the disc.

A servo processor 246 provides intelligent control of actuator assembly 210 and spindle motor 220 through a servo controller 248. By commands issued to servo controller 248 by servo processor 246, VCM driver 250 is coupled to move actuator assembly 210 and spindle motor driver 252 is coupled to maintain a constant spin rate of spindle motor 220.

PCBA 202 includes a host interface disc controller (HIDC) application-specific integrated circuit (ASIC) 228. ASIC 228 includes a host interface 230, a buffer controller 232, and a disc controller 234. Host interface 230 communicates with host system 206 via host bus connector 208 by receiving commands and data from and transmitting status and data back to host system 206. A command queuing engine (CQE) 258 is incorporated in host interface 230.

Buffer controller 232 controls a non-volatile buffer memory 236. Disc controller 234 tracks the timing of data sectors passing under a currently selected transducer head and accordingly sends data to and receives data from read/write channel 226. Disc controller 234 also provides for error correction and error detection on data transmitted to and read from discs 214.

An interface processor 238 manages a queue of commands received from host 206 with the assistance of the CQE 258 embedded in host interface 230. Interface processor 238 interfaces with functional elements of PCBA 202 over a bus 240, for transfer of commands, data, and status.

Disc system operational programs may be stored in non-volatile program storage memory 254, such as read-only memory (ROM) or flash memory, and are loaded into random access memory (RAM) or program loading memory 256 for execution by interface processor 238. Suitably, servo processor 246 may have integrated or separate memory 260 for storage of servo programs.

As mentioned above, preamplifier 212 provides an amplified signal to a read/write channel 226 of PCBA 202. Further, preamplifier 212 may include fly height control circuitry and associated head-heating circuitry 213. In accordance with some embodiments, head heating circuitry 213 can provide an AC injection signal to heaters 217 in the sliders/heads 222. In some embodiments, applying a suitable AC injection signal with the help of head heating circuitry 213 involves utilizing fly height control values (e.g., digital to analog converter (DAC) values) in a register 219 included in, or coupled to, the head heating circuitry 213. In certain embodiments, register 219 includes a table that contains identifiers for different zones on discs 215 and corresponding different heater DAC values.

Figure 3:
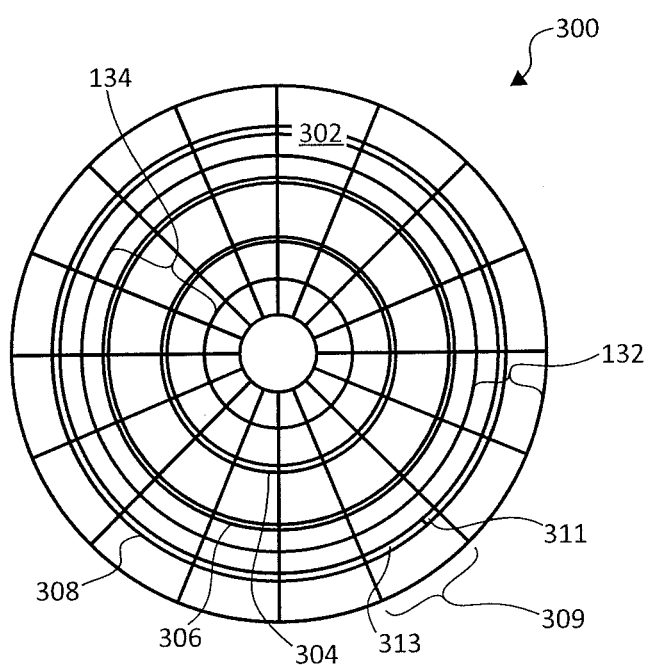
FIG. 3 is a diagrammatic representation of a simplified top view of a first disc included in the disc drive of FIG. 2.
Figure 4:
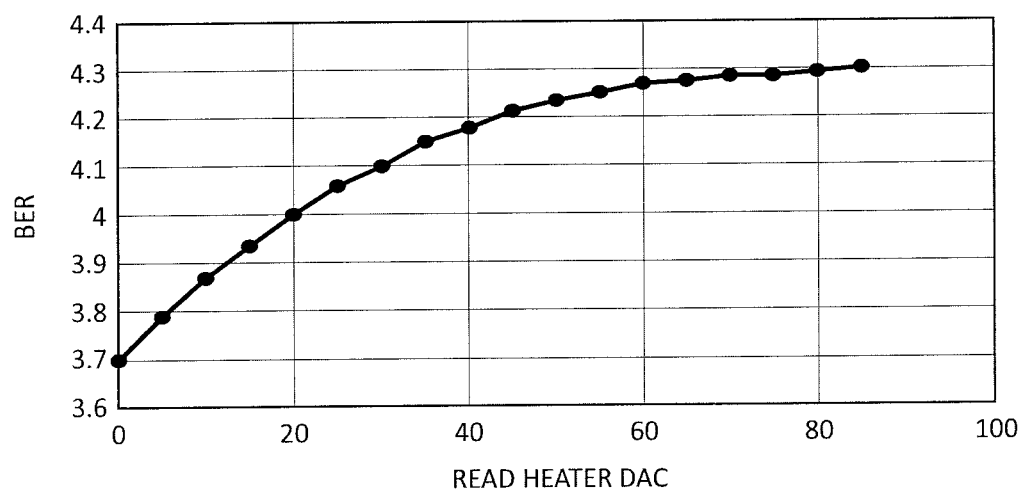
FIG. 4 illustrates a graph showing system data zone bit error rate (BER) versus read heater digital to analog converter (DAC) values.

FIG. 3 is a diagrammatic representation of a simplified top view of a disc 300 having a surface 302 which includes a system data zone and a user data zone according to one example. Disc 300 can be, for example, a single disc of disc pack 214 of FIG. 2. As illustrated in FIG. 3, disc 300 includes a plurality of concentric tracks 304, 306 and 308 for storing data on the disc's surface 302. Although FIG. 3 only shows a small number of tracks (e.g., 3) for ease of illustration, it should be appreciated that typically many thousands of tracks are included on the surface 302 of disc 300. As indicated above, disc 300 includes a system data zone 132 and at least one user data zone 134. As indicated earlier, the areal density of data stored in the system data zone 132 is substantially less than the areal data density of the data stored in the user data zone 134. Thus, as indicated above, system data may be read at high clearance values. FIG. 4 illustrates a graph showing system data zone bit error rate (BER) versus read heater DAC for one disc drive embodiment. In such an embodiment, data can be read with BER greater than 1.9, and therefore the system data zone 132 may be read back even at passive clearance (e.g., with a 0 DAC value). Reading the system data zone 132 at a relatively high fly height minimizes head-medium contact and thereby protects the system data zone 132, which stores drive information.

Referring back to FIG. 3, each track 304, 306 and 308 is divided into a plurality of sectors 309. Each of sectors 309 are typically divided into a servo portion 311 and a data storage portion 313. The servo portions 311 include servo marks that are read by a read transducer of transducer head 222 (of FIG. 2). Preamplifier 212 (of FIG. 2) conditions the analog signal received from the read transducer. Read/write channel 226 (of FIG. 2) receives the conditioned signal and decodes digital servo data from the signal. Part of the conditioning performed by the preamplifier involves amplifying the analog signal to a predetermined level by a variable gain amplifier (VGA), which facilitates accurate decoding of the data via the decoder. The amount of gain provided by the servo VGA is inversely proportional to the signal strength of the read transducer. Also, the signal strength is inversely proportional to the fly height. Thus, fly height may be detected from the servo VGA by, for example, fly height detection circuitry 249 (shown in FIG. 2). It should be noted that, although fly height detection circuitry 249 is shown as being a part of servo controller 248, circuitry 249 may be located elsewhere in the disc drive 200 (e.g., within preamplifier 212). Data VGA from reading user data storage portion 313 or bit error rate (BER) may be used, instead of servo VGA, to determine fly height in alternate embodiments.

As noted above, fly height control values (e.g., DAC values) may be stored in registers 219 (of FIG. 2). In one embodiment, register 219 may include a read heater DAC value, which may be utilized to obtain a target fly height for read operations to obtain user data. In some embodiments, data from the system data zone 132 is read with half the read heater DAC used for obtaining the target fly height for reading user data. Thus, if R_H is the read heater DAC value for the target fly height for reading user data, then the read heater DAC used for reading the data from the system data zone (H_R_H) is $$H\_R\_H = R\_H/2 \quad \text{Equation 1}$$

In one embodiment, R_H is about 40 DAC and therefore H_R_H is about 20 DAC. A method embodiment that employs H_R_H for reading the system data is described below in connection with FIG. 5.

Figure 5:
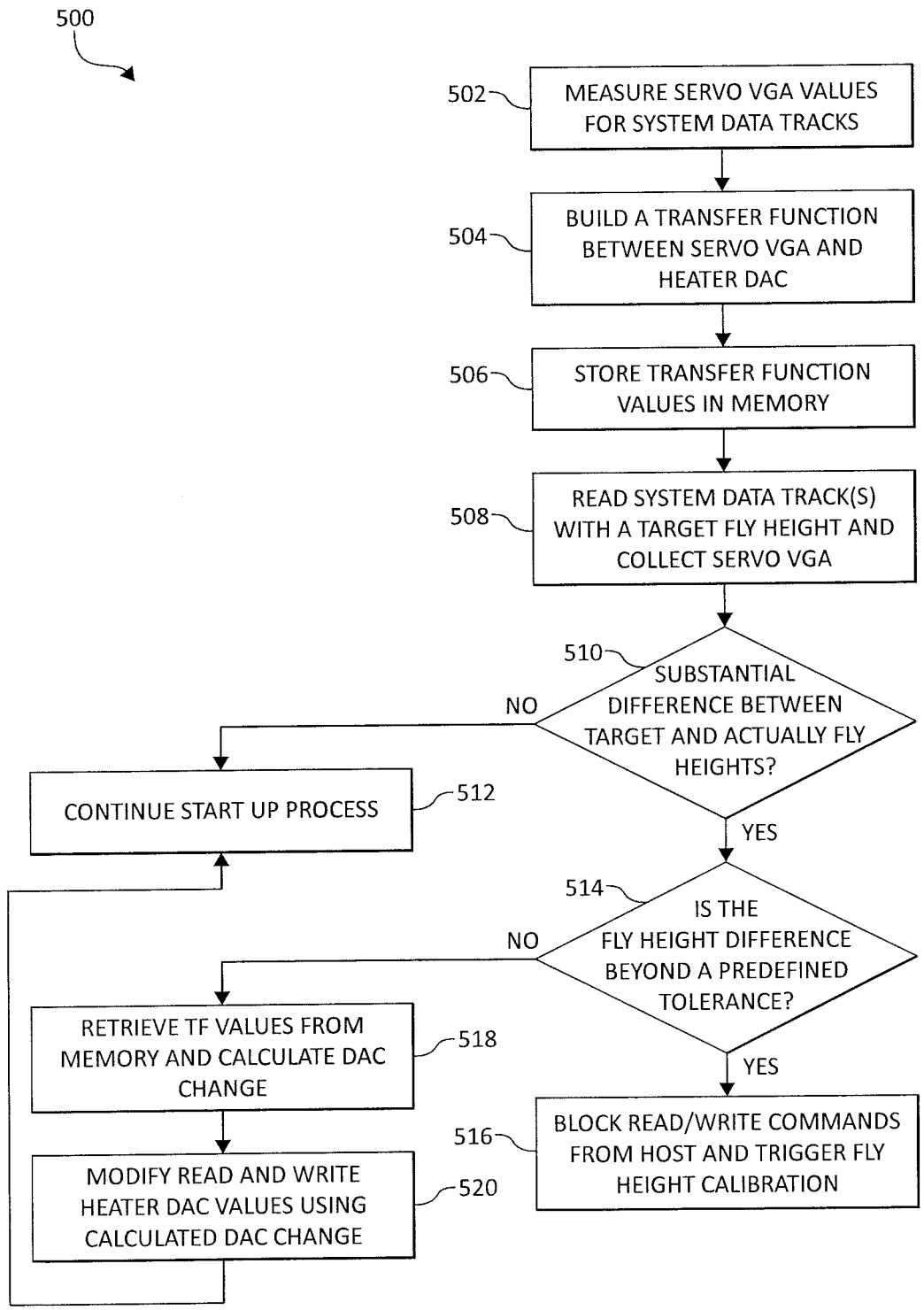
FIG. 5 is a flow diagram of a method embodiment.

FIG. 5 is a flow diagram 500 of a method embodiment, which can be carried out with the help of disc controller 234 (of FIG. 2), for example. In FIG. 5, blocks 502, 504 and 506 include functions performed during a certification process at the time of manufacture of the data storage device and the remaining blocks includes functions performed in the field.

Figure 6A:
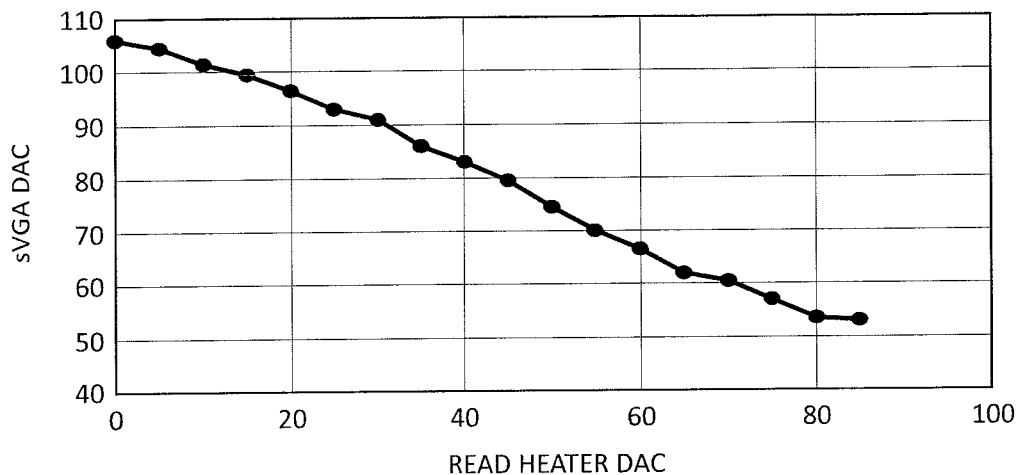
FIG. 6A is a graph that shows a plot of servo variable gain amplifier (VGA) values versus reader heater DAC values.
Figure 6B:
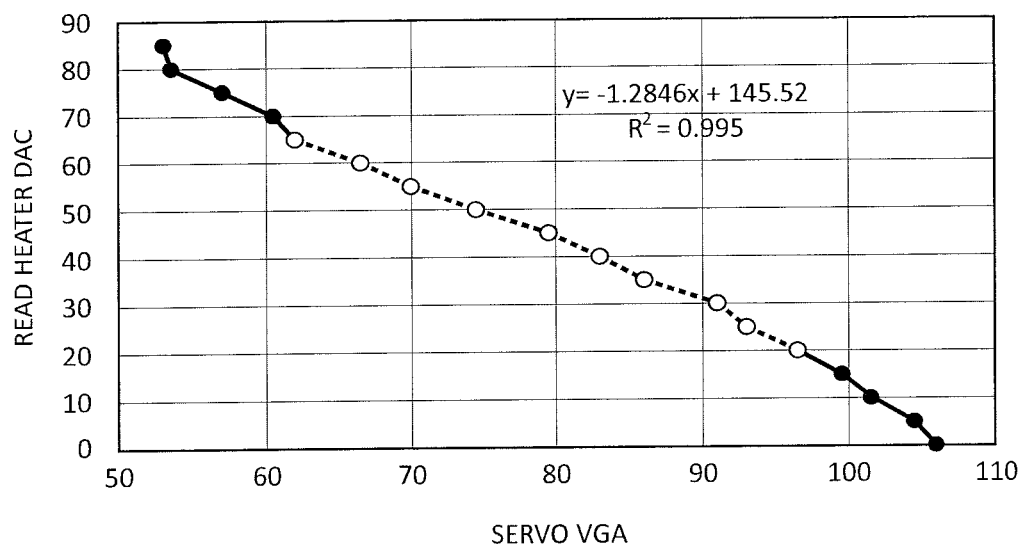
FIG. 6B illustrates a transfer function between read heater DAC and servo VGA.

At block 502, servo VGA values for system tracks are measured using different heater DAC values. FIG. 6A is a graph that shows servo VGA versus reader heater DAC. As can be seen in FIG. 6A, servo VGA is inversely proportional to heater DAC. Referring back to FIG. 5, at block 504, a transfer function (TF) between servo VGA and read heater DAC is built. The selected read heater DAC range may be H_R_H+/−20 for better linearity to build the TF. FIG. 6B illustrates a TF (e.g., y=−1.846x+145.52) between the read heater DAC and servo VGA. In FIG. 6B, $R^2$ is a statistical measure of how close the data are to the fitted regression line. Referring back to FIG. 5, at block 506, H_R_H, servo VGA at H_R_H, and parameters of the TF are stored in a suitable memory in the data storage device. In one embodiment, the H_R_H, servo VGA at H_R_H, and parameters of the TF are stored in a solid-state memory (e.g., serial Flash memory) on a PCBA of the data storage device (e.g., non-volatile memory 254 on PCBA 202 of FIG. 2). A copy of the H_R_H, servo VGA at H_R_H, and parameters of the TF may be stored on discs 215.

During start-up initialization of the data storage device in the field, at block 508, system data zone tracks are read with read heater DAC=H_R_H while simultaneously collecting servo VGA to determine an actual fly height. At block 510, a check is carried out for substantial fly height difference between a target fly height for H_R_H and the actual fly height by comparing the collected servo VGA values against previously stored VGA values for H_R_H (e.g., values stored at block 506). If there is no substantial fly height difference between the target fly height for H_R_H and the actual fly height for H_R_H (e.g., no difference or a difference within a pre-determined range (e.g., +/−2 angstroms)), control moves to block 512 at which the normal start-up process is continued. If the fly height difference is beyond the predefined range, control passes to block 514 at which a determination is made as to whether the fly height difference is beyond a predefined compensation tolerance (e.g., +/−10 angstroms). If the fly height difference is beyond the predefined compensation tolerance, at block 516, read and write commands form a host coupled to the data storage device are blocked and fly height calibration is triggered in the data storage device. If the fly height difference is beyond the predefined range but not beyond the predefined compensation tolerance, at block 520, the TF (which was already retrieved from, for example, the serial Flash store to carry out the function of block 510) is utilized to calculate a read heater DAC change. The calculation of the read heater DAC change may involve using the TF to map the fly height difference to a suitable DAC value, which is utilized as the DAC heater change value. At block 520, adjustments may be made to both read heater DAC and write heater DAC values. The adjustments may be as follows:

$$\text{New Read Heater } DAC = \text{Old Read Heater } DAC + \text{Heater } DAC \text{ change} \quad \text{Equation 2}$$

where New Read Heater DAC is a new read heater DAC value, Old Read Heater DAC is a read heater DAC value employed during the power up initialization, and Heater DAC change is the calculated read heater DAC change value.

$$\text{New Write Heater } DAC = \text{Old Write Heater } DAC + \text{Heater } DAC \text{ change} \times WF \qquad \text{Equation 3}$$

where New Write Heater DAC is a new write heater DAC value, Old Write Heater DAC is a write heater DAC value before the power up initialization, Heater DAC change is the calculated read heater DAC change value and WF is a ratio of the read heater DAC value employed during the power up initialization to the write heater DAC value prior to the power up initialization. After calculations are carried out using equations 2 and 3, the control passes to block 512 at which operation of the data storage device is continued with the new read heater DAC value and the new write heater DAC value.

Figure 7:
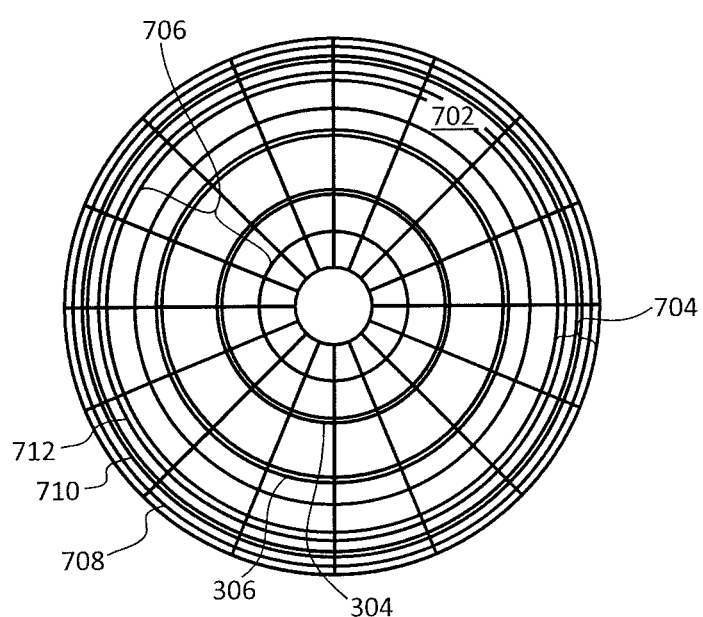
FIG. 7 is a diagrammatic representation of a simplified top view of a second disc included in the disc drive of FIG. 2.

In a data storage device that includes multiple storage surfaces and different heads that communicate with the different data storage surfaces, one (e.g., a first one) of the multiple storage surfaces will include the system data zone (e.g., disc surface 302 of FIG. 3), and no system data zones may be present on the remaining ones of the multiple data storage surfaces. Accordingly, to analyze fly height changes of heads associated with surfaces other than the first surface, a mini-zone (referred to herein as a clearance calibration zone (CCZ)) is created for each of the other media surfaces. FIG. 7 illustrates an example of a media surface other than the first one of the media surfaces, which is referred to herein as a second surface. Second surface 702 includes a CCZ 704 and at least one user data zone 706. A CCZ such as 704 may include, for example, 3-5 tracks of a same or comparable BPI (bits per inch) and TPI (tracks per inch) as a system data zone such as 132. Three tracks 708, 710 and 712 are shown in the FIG. 7. Of the 3-5 tracks, a middle track (e.g., track 710) may be a test track and the remaining tracks (e.g., 708 and 712) may serve as guard bands. CCZ 704 tracks (e.g., 708, 710 and 712) are positioned at same cylinders as the system data zone (e.g., 132) and therefore head-switch seeks are avoided during the fly height checking operation, thereby helping minimize an impact the data storage device TTR. It should be noted that, in a data storage device that includes multiple storage surfaces, a TF of the type described above in connection with FIGS. 5 and 6B is developed for each head during the data storage device certification process.

During start-up initialization of the data storage device in the field, the system data zone tracks are read by the first head with read heater DAC=H_R_H while simultaneously collecting servo VGA. If there is a fly height change that is beyond a predefined range for the first head, a fly height change detection operation is carried out for the other heads. If there is no fly height change or the fly height change is within the predefined range for the first head, a NOS detection result (e.g., a servo NOS detection result) is utilized to determine whether to perform fly height change detection and calibration for the other heads. This is because, if NOS occurred, the fly height of the first head may be unaffected by the NOS, but fly heights of one or more of the remaining heads may be changed. Thus, if NOS is detected, fly heights of one or more heads may be suitably corrected. It should be noted that NOS detection is performed as part of the storage device start-up initialization operation and therefore there is no TTR impact for normal spin-up unless NOS actually occurred. One scheme to determine the occurrence of NOS is based at least in part on detecting a harmonic of the spindle of the disc drive. Fly height change compensation or correction details are not repeated for the multiple storage surface embodiment because the procedure is similar to that described above in connection with FIG. 5.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A disc drive comprising:
  a first data storage surface having a system data zone and at least one user data zone;
  a first head that communicates with the first data storage surface; and
  a control circuit communicatively coupled to the first head, the control circuit configured to:
    during power up initialization of the disc drive:
      apply a first fly height control value to direct the first head to fly at a first target fly height for reading system data from the system data zone, the first target fly height being substantially higher than a second target fly height for reading user data from the user data zone; and while the first head is reading the system data with the first fly height control value applied to the first head, determine whether an actual fly height of the first head is substantially equal to the first target fly height; and perform fly height correction when the actual fly height is not substantially equal to the first target fly height.

2. The disc drive of claim 1 and wherein the first fly height control value is a heater digital to analog control (DAC) value.

3. The disc drive of claim 1 and wherein the control circuit is configured to perform the fly height correction by employing transfer function information obtained during certification of the disc drive and stored in the disc drive.

4. The disc drive of claim 3 and wherein the transfer function information is stored in a solid-state memory in the disc drive.

5. The disc drive of claim 3 and wherein the first head comprises a read heater, and wherein the transfer function information is obtained from a transfer function between servo system variable gain amplifier (VGA) values and read heater digital to analog converter (DAC) values utilized to generate the servo system VGA values.

6. The disc drive of claim 5 and wherein the control circuit is configured to perform the fly height correction by calculating a read heater DAC change value from the transfer function and employing the calculated read heater DAC change value to obtain a new read heater DAC value as follows:

New Read Heater $DAC$=Old Read Heater $DAC$+ Heater $DAC$ change where New Read Heater DAC is the new read heater DAC value, Old Read Heater DAC is a read heater DAC value employed during the power up initialization and Heater DAC change is the calculated read heater DAC change value.

7. The disc drive of claim 6 and wherein the first head further comprises a write heater, and wherein the control circuit is further configured to perform the fly height correction by employing the calculated heater DAC change value to obtain a new write heater DAC value as follows:

New Write Heater $DAC$=Old Write Heater $DAC$+ Heater $DAC$ change×$WF$ where New Write Heater DAC is the new write heater DAC value, Old Write Heater DAC is a write heater DAC value before the power up initialization, Heater DAC change is the calculated read heater DAC change value and WF is a ratio of the read heater DAC value employed during the power up initialization to the write heater DAC value prior to the power up initialization.

8. The disc drive of claim 3 and wherein the control circuit is configured to perform the fly height correction by employing the transfer function information when the actual fly height is outside a first predefined fly height range having a first upper limit and a first lower limit and when the actual fly height is not beyond a second upper limit, which is greater than the first limit, and not below a second lower limit, which is less than the first lower limit.

9. The disc drive of claim 8 and wherein the control circuit is configured to perform the fly height correction by determining whether the actual fly height is outside a second predetermined fly height range having the second upper limit and the second lower limit and, when the actual fly height is outside the second predetermined fly height range, block read and write operations to the disc drive and trigger fly height calibration.

10. The disc drive of claim 1 and further comprising:
a plurality of data storage surfaces including the first data storage surface and at least a second data storage surface; and
a plurality of heads including the first head and at least a second head that communicates with the second data storage surface, and
wherein the second data storage surface does not include any system data zone.

11. The disc drive of claim 10 and wherein the second data storage surface comprises a clearance calibration zone.

12. The disc drive of claim 11 and wherein the control circuit is further configured to:
perform a non-operational shock detection operation when the actual fly height of the first head is substantially equal to the first target flight;
perform a fly height change detection operation for the second head when the non-operation shock is detected; and
perform fly height correction for the second head based on a result of the fly height change detection operation.

13. A method comprising:
performing certification operations in a disc drive that includes at least one data storage surface and a head that communicates with the data storage surface, the certification operations comprising:
building a transfer function for use in correcting fly height of the head over the at least one data storage surface;
storing, in the disc drive, parameters of the transfer function and a first fly height control value for directing the head to fly at a first target fly height for reading system data from the system data zone, the first target fly height being substantially higher than a second target fly height for reading user data from the user data zone; and
performing field operations in the disc drive, the field operations comprising:
during power up initialization of the disc drive, applying the first fly height control value to direct the head to fly at the first target fly height for reading system data from the system data zone.

14. The method of claim 13 and further comprising, while the head is reading the system data with the first fly height control value applied to the head, determining whether an actual fly height of the head is substantially equal to the first target fly height.

15. The method of claim 14 and further comprising performing fly height correction when the actual fly height is not substantially equal to the first target fly height.

16. The disc drive of claim 15 and further comprising performing the fly height correction by employing the transfer function parameters.

17. A method comprising:
applying a first fly height control value to direct a head to fly at a first target fly height for reading system data from a system data zone of a data storage surface, the first target fly height being substantially higher than a second target fly height for reading user data from a user data zone of the data storage surface; and
while the head is reading the system data with the first fly height control value applied to the head, determining whether an actual fly height of the head is substantially equal to the first target fly height; and performing fly height correction when the actual fly height is not substantially equal to the first target fly height.

18. The method of claim 17 and further comprising performing the fly height correction by employing transfer function information obtained during certification of a disc drive including the head and the data storage surface, the transfer function information being stored in the disc drive.

19. The method of claim 18 and further comprising performing the fly height correction by employing the transfer function information when the actual fly height is outside a first predefined fly height range having a first upper limit and a first lower limit and when the actual fly height is not beyond a second upper limit, which is greater than the first limit, and not below a second lower limit, which is less than the first lower limit.

20. The method of claim 19 and further comprising performing the fly height correction by determining whether the actual fly height is outside a second predetermined fly height range having the second upper limit and the second lower limit and, when the actual fly height is outside the second predetermined fly height range, blocking read and write operations to the disc drive and triggering fly height calibration.

* * * * *